(12) United States Patent
Munk-Hansen

(10) Patent No.: US 11,073,138 B2
(45) Date of Patent: Jul. 27, 2021

(54) WIND TURBINE NACELLE PLATFORM STRUCTURE

(71) Applicant: Siemens Gamesa Renewable Energy A/S, Brande (DK)

(72) Inventor: Thorkil Munk-Hansen, Fredericia (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 182 days.

(21) Appl. No.: 16/114,513

(22) Filed: Aug. 28, 2018

(65) Prior Publication Data
US 2019/0072084 A1 Mar. 7, 2019

(30) Foreign Application Priority Data

Sep. 6, 2017 (EP) ..................................... 17189667

(51) Int. Cl.
*F03D 80/80* (2016.01)
*F03D 80/50* (2016.01)
*F03D 1/00* (2006.01)
*F03D 13/20* (2016.01)

(52) U.S. Cl.
CPC .............. *F03D 80/80* (2016.05); *F03D 1/00* (2013.01); *F03D 80/50* (2016.05); *F03D 13/20* (2016.05); *F05B 2240/14* (2013.01); *F05B 2240/912* (2013.01); *F05B 2240/916* (2013.01); *F05B 2260/20* (2013.01)

(58) Field of Classification Search
CPC ............ F05B 2240/916; F05B 2240/14; F03D 80/88; F03D 80/80; F03D 13/20; F03D 80/60

See application file for complete search history.

(56) References Cited

U.S. PATENT DOCUMENTS

| 7,837,443 | B2 * | 11/2010 | Mikkelsen | F03D 80/30 416/146 R |
| 8,371,820 | B2 * | 2/2013 | deBuhr | F03D 80/50 416/244 R |
| 8,640,478 | B2 * | 2/2014 | Kim | F03D 1/00 62/259.1 |
| 9,133,826 | B2 * | 9/2015 | Munk-Hansen | F03D 80/60 |

(Continued)

FOREIGN PATENT DOCUMENTS

CN 103523182 A 1/2014
DE 10013442 C1 10/2001

(Continued)

OTHER PUBLICATIONS

English Translation of Chinese Office Action for Application No. 201811037939.X, dated Oct. 30, 2019.

*Primary Examiner* — Courtney D Heinle
*Assistant Examiner* — Andrew Thanh Bui
(74) *Attorney, Agent, or Firm* — Schmeiser, Olsen & Watts LLP

(57) ABSTRACT

A wind turbine nacelle platform structure including a beam assembly with at least two beams arranged to extend from a front region of a nacelle outward beyond the back end of the nacelle and a platform assembly mounted to the underside of the outward extending portion of the beam assembly. The disclosed further describes a wind turbine including a nacelle mounted on top of a tower, and such a nacelle platform structure secured to the nacelle.

18 Claims, 5 Drawing Sheets

(56) References Cited

U.S. PATENT DOCUMENTS

| | | | | |
|---|---|---|---|---|
| 9,228,562 | B2* | 1/2016 | Mercado Diez | F03D 80/00 |
| 9,359,911 | B2* | 6/2016 | Abolfazlian | B66C 23/207 |
| 9,683,555 | B2* | 6/2017 | Arndt | F03D 80/00 |
| 9,926,717 | B2* | 3/2018 | Abreu | E04B 1/19 |
| 2012/0152651 | A1* | 6/2012 | Jensen | F03D 80/50 |
| | | | | 182/113 |
| 2012/0181792 | A1* | 7/2012 | Pettersen | F03D 80/70 |
| | | | | 290/55 |
| 2014/0219801 | A1 | 8/2014 | Mazyar et al. | |

FOREIGN PATENT DOCUMENTS

| | | | |
|---|---|---|---|
| DE | 20205396 U1 | 11/2002 | |
| EP | 1134410 A1 | 9/2001 | |
| EP | 2300709 A2 | 3/2011 | |
| EP | 2466129 A2 | 6/2012 | |
| EP | 2469074 A1 | 6/2012 | |
| EP | 2505541 A1 * | 10/2012 | ............ F03D 80/88 |
| EP | 2505541 A1 | 10/2012 | |
| EP | 2520798 A1 | 11/2012 | |
| EP | 2691649 A2 | 2/2014 | |
| WO | WO 2012150502 A1 | 11/2012 | |

\* cited by examiner

WIND TURBINE NACELLE PLATFORM STRUCTURE

CROSS-REFERENCE TO RELATED APPLICATIONS

This application claims priority to European application No. EP17189667 having a filing date of Sep. 6, 2017, the entire contents of which are hereby incorporated by reference.

FIELD OF TECHNOLOGY

The following relates to a nacelle platform structure for a wind turbine, and a wind turbine with such a nacelle platform structure.

BACKGROUND

A wind turbine may be installed at a remote location, for example offshore. Technicians may need to access the nacelle to perform maintenance at regular intervals, or to carry out repairs as necessary. In the case of offshore wind turbines or even remotely-located wind turbines on land, personnel are generally brought and fetched by helicopter, since this mode of transport is relatively quick. Helicopters may also be the preferred mode of transport in the case of very tall wind turbine towers, since ascent and descent from the tower may be time-consuming and hazardous.

To this end, such wind turbines are generally equipped with a landing platform that can support a helicopter (i.e. a "helicopter landing platform" or "helipad"), or a smaller landing platform that can support personnel and material when lowered from a hovering helicopter (i.e. a "heli-hoist platform" or winching platform).

A platform that is large enough to support a helicopter can generally only be provided if the nacelle has sufficiently large dimensions. In some approaches, a helicopter landing platform is provided on the roof of the nacelle. Such a realisation may be possible in the case of geared wind turbines that have a large nacelle and/or a large bedframe to provide structural support to the landing platform. In an alternative approach, the nacelle of a wind turbine may be shaped to provide a recess that serves as a heli-hoist platform.

A direct-drive wind turbine generally does not have a large nacelle or a large bedframe. It is known to provide structural members extending from the sides or base of the smaller nacelle in order to carry a helicopter landing platform.

The known constructions generally add significantly to the overall cost of the wind turbine, often requiring a dedicated nacelle design or the alteration of the nacelle design in order to provide for the necessary structural supporting elements required by the heli-pad or heli-hoist platform.

Furthermore, the safety of any personnel using the known types of platform may be seriously compromised. Particularly in the case of a heli-hoist manoeuvre, a serious risk may be posed by any structural element that can catch or snag a hook or cable of a winching apparatus.

SUMMARY

An aspect relates to providing an economical but safe helicopter access for a wind turbine.

According to the invention, the wind turbine nacelle platform structure comprises a beam assembly comprising a pair of beams that are arranged to extend from a front region of a nacelle outward beyond the back end of the nacelle; and a heli-hoist platform assembly mounted to the underside of the outward extending portion of the beam assembly.

In the context of the invention, the beams of the beam assembly extend outward beyond the back end or downwind end of the nacelle. In other words, the beams of the beam assembly extend into open space beyond the downwind end of the nacelle. Any attachment points between beam assembly and nacelle are on the roof of the nacelle and/or through the roof of the nacelle. Advantageously, in contrast to the equivalent known structures described above, the beams of the beam assembly do not require any further support. Furthermore, the inventive nacelle platform structure favourably does not require any alteration of the nacelle design.

As explained above, a heli-hoist platform (also referred to as a winching area or winching platform) allows personnel and material (tools, replacement parts, etc.) to be lowered to the level of the nacelle from a helicopter hovering in place, and to be lifted back up to the helicopter. An advantage of the nacelle platform structure according to embodiments of the invention is that the platform is already enclosed on two sides by the protective barrier given by the beams, which extend outward beyond the back end of the nacelle. This is because the platform assembly is mounted to the underside of the outward extending portion of the beam assembly. It may be assumed that the platform assembly extends across the distance separating the pair of beams. By mounting the platform assembly to the underside of the beams, any protruding mechanical connections can be "hidden", i.e. they will not present a hazard during a heli-hoist manoeuvre.

According to the invention, the wind turbine comprises a nacelle mounted on top of a tower, and an embodiment of the inventive nacelle platform structure, secured to the nacelle.

The inventive nacelle platform structure can be installed when the wind turbine is constructed, or can replace an existing platform in an upgrade step, for example. With the inventive nacelle platform structure in place, any heli-hoist manoeuvre can be safely carried out, and risks to personnel or helicopter pilot can be favourably minimized.

In the following, it may be assumed that the wind turbine is installed at a remote and/or offshore location. Personnel are generally brought to such wind turbines by helicopter, since this mode of transport is relatively quick. Without restricting embodiments of the invention in any way, it may also be assumed that the wind turbine is a direct-drive wind turbine. The inventive nacelle platform structure is particularly advantageous when installed on a direct-drive wind turbine, since the nacelle of a direct-drive wind turbine is generally smaller and shorter than the nacelle of a comparable geared wind turbine, and the roof or upper surface of a direct-drive wind turbine nacelle generally cannot be used as a landing surface for a helicopter or as a winching area for personnel in a heli-hoist manoeuvre. Without restricting embodiments of the invention in any way, it may be assumed in the following that the platform is realised as a heli-hoist platform. Such a platform supports personnel when lowered from a hovering helicopter, or when waiting to be raised to the hovering helicopter. Of course, with appropriate dimensions and choice of material, the inventive nacelle platform structure may be realised as a landing platform to support a helicopter.

The platform assembly can be constructed or realised in any suitable manner. In a preferred embodiment of the invention, the heli-hoist platform assembly comprises an arrangement of joists, bars or slats mounted to the underside of the outward extending portion of the beam assembly. For example, a series of flat-topped joists, bars or slats (which will form the floor of the platform) can be bolted or otherwise fastened to the undersides of the outward extending portions of the beams. The joists, bars or slats of the platform can be shaped to abut each other to achieve a close fit, leaving as few gaps as possible between adjacent elements. Preferably, the beams of the beam assembly are separated by a sufficient distance and extend by a sufficient amount beyond the back end of the nacelle to achieve a winching area that can contain a circle with a minimum diameter of 4 metres. In this way, the nacelle platform structure can offer a winching area that fulfils standard requirements, for example to comply with a standard issued by the Civil Aviation Authority of the UK. In a preferred embodiment of the invention, the platform or floor is formed at the same level as the nacelle roof, so that it presents an extension of the nacelle roof. An advantage of this realisation is the favourably large winching area or working surface that results, since part of the nacelle roof can contribute to the overall winching area.

Any gap or opening in the heli-hoist platform may pose a risk during a heli-hoist manoeuvre, since a hook at the end of a cable may swing about and get caught in such a gap or opening. Any protrusion may also present a risk since it might snag a rope or cable. Therefore, in a particularly preferred embodiment of the invention, the nacelle platform structure comprises cladding arranged to cover essentially all gaps and/or protrusions in relevant regions of the heli-hoist platform assembly. Preferably, the cladding covers any gaps and/or protrusions at least in the platform region, i.e. the region including the platform and the parts of the beams that enclose the platform. The cladding preferably also covers the outside surfaces of the platform region, i.e. the outside walls of the beams and any outside surfaces of the arrangement of joists, bars or slats mounted to the underside of the outward extending portion of the beam assembly.

The beam assembly in its simplest form may comprise a pair of beams, one arranged along each outer side of the nacelle to extend some distance beyond the downwind end of the nacelle. In some embodiments, the beam assembly may include additional beams such that there are at least two beams. In a an embodiment of the invention, the nacelle platform structure comprises a protective barrier extending between the outermost ends of the beams, so that the heli-hoist platform is enclosed on three sides. The protective barrier at the rear of the platform can be an end-plate such as a solid plate, a railing (with cladding), etc. Equally, the platform end-plate can comprise a structure that forms part of the wind turbine cooling arrangement. The height of the platform end-plate is also preferably at least 1.5 m in height. The end-plate may also be provided with a hinged or otherwise moveable section that can be used to facilitate the moving of service equipment.

In a further preferred embodiment of the invention, the platform comprises one or more hatch openings to allow equipment to be lowered through the platform along the downwind end of the nacelle (for example during service work on the yaw drive assembly) or to ground-level or sea-level (for example when a large component is being replaced). To accommodate such a hatch, the joists, bars or slats of the platform are arranged accordingly.

A beam of the beam assembly can be mounted to the nacelle in any suitable way. In a preferred embodiment of the invention, a beam is secured to the nacelle from within the interior of the nacelle. Preferably, the mechanical connections between nacelle and beam are such that the beam assembly also contributes to the overall structural stiffness of the nacelle.

In a straightforward realisation of the inventive nacelle platform structure, a beam may comprise a steel I-beam or similar, and may be bolted or welded to a structural framework of the nacelle over the portion of the I-beam that lies on the upper surface of the nacelle. Joists or spars of the platform may also be welded or bolted to the underside of the beam along the portion that protrudes outward from the downwind end of the nacelle.

However, in a preferred embodiment of the invention, the beam assembly also fulfils a safety function by providing a barrier. Preferably therefore, a beam of the beam assembly has a height of at least 1.5 m so that it can fulfil the applicable safety requirements. Alternatively, the beam itself may have a height that is lower than 1.5 m, and an additional railing mounted on the beam can provide the necessary height for the protective barrier. Such a railing can be covered in cladding if there are any gaps to close.

In a particularly preferred embodiment of the invention, a beam with such dimensions is constructed at least partially of a composite material. In such a favourable embodiment, a beam of the beam assembly can be essentially hollow, and the reduced weight can allow the beam to be manufactured with a favourable height, at least in the region of the landing platform. For example, considering a beam with a rectangular or square cross-section, the "floor" can comprise a steel plate which can be bolted or otherwise fastened to the upper surface of the nacelle. The remaining three sides ("walls" and "roof" of the beam) can be moulded in one piece in a composite moulding procedure. Of course, interior struts or other structural strengthening elements can be included or embedded at intervals along the length of the beam as required. Such a realisation can have an advantageously low weight as well as adequate structural strength.

An essentially hollow beam of a beam assembly can have further advantages in addition to being light and economical to manufacture. For example, in a particularly preferred embodiment of the invention, an interior cavity of the beam can be connected by means of a connecting passage with the interior cavity of the nacelle. This allows the hollow interior of the beam to be put to use in augmenting a cooling arrangement of the wind turbine, for example. In a particularly preferred embodiment of the invention, a beam of the beam assembly comprises an air intake opening, and an intake fan arranged in the interior of the beam to draw a cooling airflow into the interior of the nacelle. In this way, the beams of the inventive nacelle platform structure can serve the additional purpose of providing one or more air intake openings to the cooling arrangement of the wind turbine. Preferably, the fan is placed in the air intake opening.

Equally, in a further preferred embodiment of the invention, a beam of the beam assembly comprises an air outlet opening, and an outlet fan arranged in the interior of the beam to expel a heated airflow to the exterior of the nacelle. In this way, the beams of the inventive nacelle platform structure can serve the additional purpose of providing one or more air outlet openings from the cooling arrangement of the wind turbine. Preferably, the fan is placed in the air outlet opening. Furthermore, instead of simply expelling the hot waste air to the exterior, one or more air outlet openings can be directed at the nacelle roof and/or the platform in order to de-ice these surfaces in cold conditions. In this way, any personnel being brought to the wind turbine in cold conditions can be sure that the platform and nacelle roof are free of ice when they land. The safety of any such landing manoeuvre can therefore be increased significantly.

Rainwater or melt-water from snow and ice should not be allowed to collect on the platform. To this end, the inventive nacelle platform structure may comprise one or more water run-off openings to ensure that the surface of the platform can be kept dry. Any such run-off openings are preferably shaped so that they are invisible to a hook or cable during a heli-hoist manoeuvre. For example, a water run-off opening can be realised as a relatively long but narrow slit with curved edges so that a hook cannot get caught. The platform can be inclined slightly towards any such run-off opening so that water will run in that direction.

A problem that can arise during a winching or hoisting manoeuvre is that of a difference between the equipotential of the wind turbine and the equipotential of personnel being lowered from a helicopter to the winching platform. Therefore, in a preferred embodiment of the invention, the platform assembly is grounded. For example, the cladding can comprise an electrically conducting material that is grounded or earthed via a nacelle support structure such as the nacelle bedframe or any other structure that is also part of an electrical path to ground. In this way, personnel can be protected from any problems associated with a significant equipotential difference.

BRIEF DESCRIPTION

Some of the embodiments will e described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
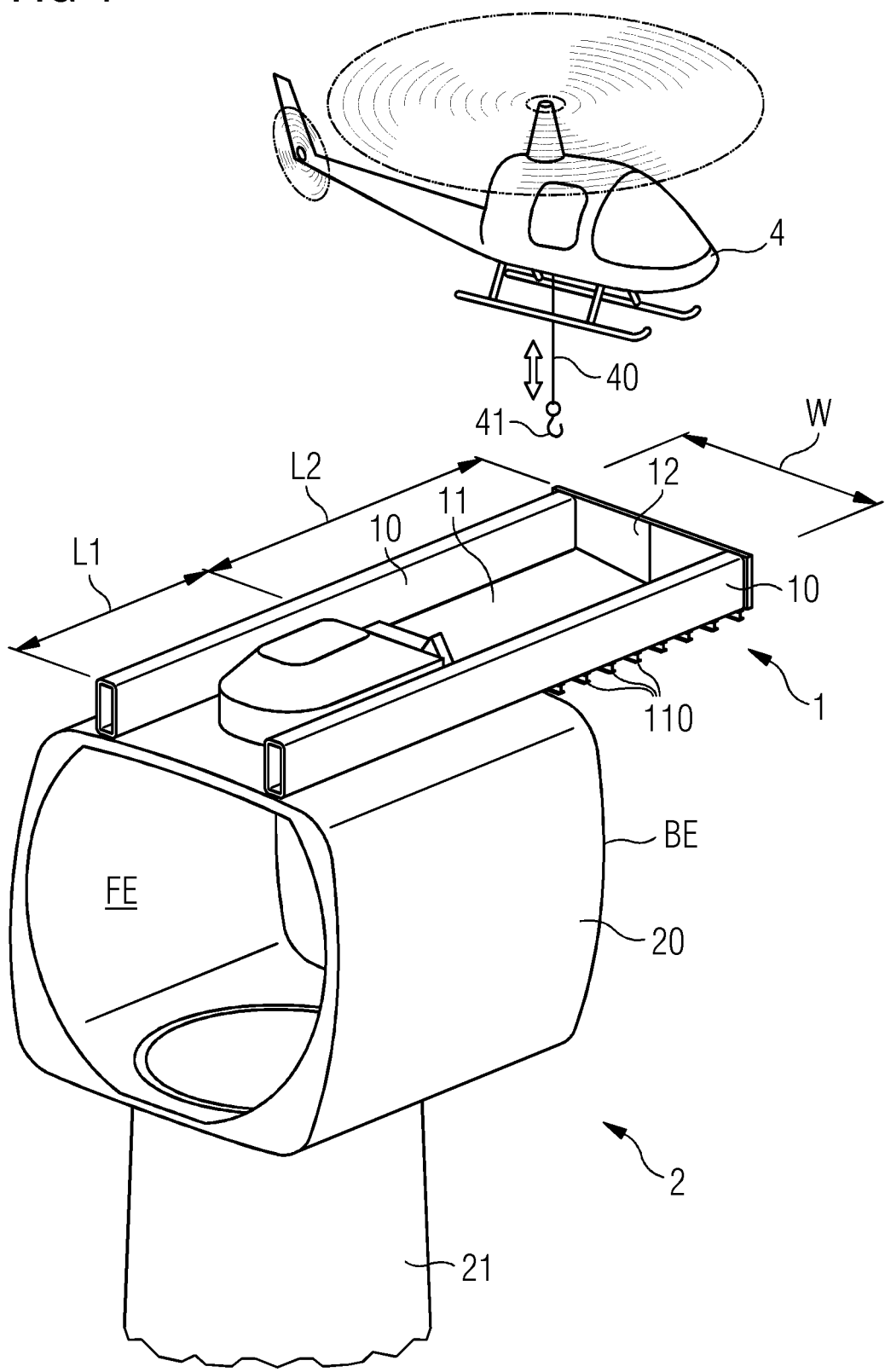
FIG. 1 shows a view from above onto an embodiment of the inventive wind turbine.

FIG. 1 shows part of an embodiment of the inventive wind turbine 2, with a nacelle 20 mounted on top of a tower 21. The diagram only shows the relevant parts of the wind turbine and does not show the rotor, hub, generator, etc. Here, an embodiment of the inventive nacelle platform structure 1 is mounted onto the roof of the nacelle 20. Two beams 10 extend along a length L1 of the nacelle roof from the front end FE of the nacelle and outward by a distance L2 beyond the back end BE of the nacelle 20. A series of supports 110 are secured to the undersides of the outward portions of the beams 10 and carry a smooth platform surface 11 or winching area 11 on which personnel can stand after being lowered to the platform from a helicopter 4 hovering above. An end-plate 12 closes off the outer end of the platform 11 and acts as a protective barrier. The beams 10 and end-plate 12 are preferably at least 1.5 m in height to fulfil safety requirements.

The supports 110 are covered by cladding as will be explained below, to conceal any gaps between the supports 110. The inner and outer side faces of the beams 10 and end plate 12 are also smooth. With these measures, there are no gaps or protrusions in the region of the platform 11 that could snag or catch a heli-hoist hook 41 or cable 40. The beams 10 are separated by a distance W. The area of a platform mounted on the supports 110 will therefore have a landing/working area of about L2×W. The length L2 and width W are preferably such that the winching area (which may also include part of the nacelle roof) is sufficiently large to accommodate a circle with a diameter of at least four metres.

The diagram also indicates a nacelle hatch structure on the roof of the nacelle, between the beams 10. After arriving at the wind turbine 2, personnel can enter the nacelle 20 through this hatch to perform any maintenance tasks, etc.

Figure 2:
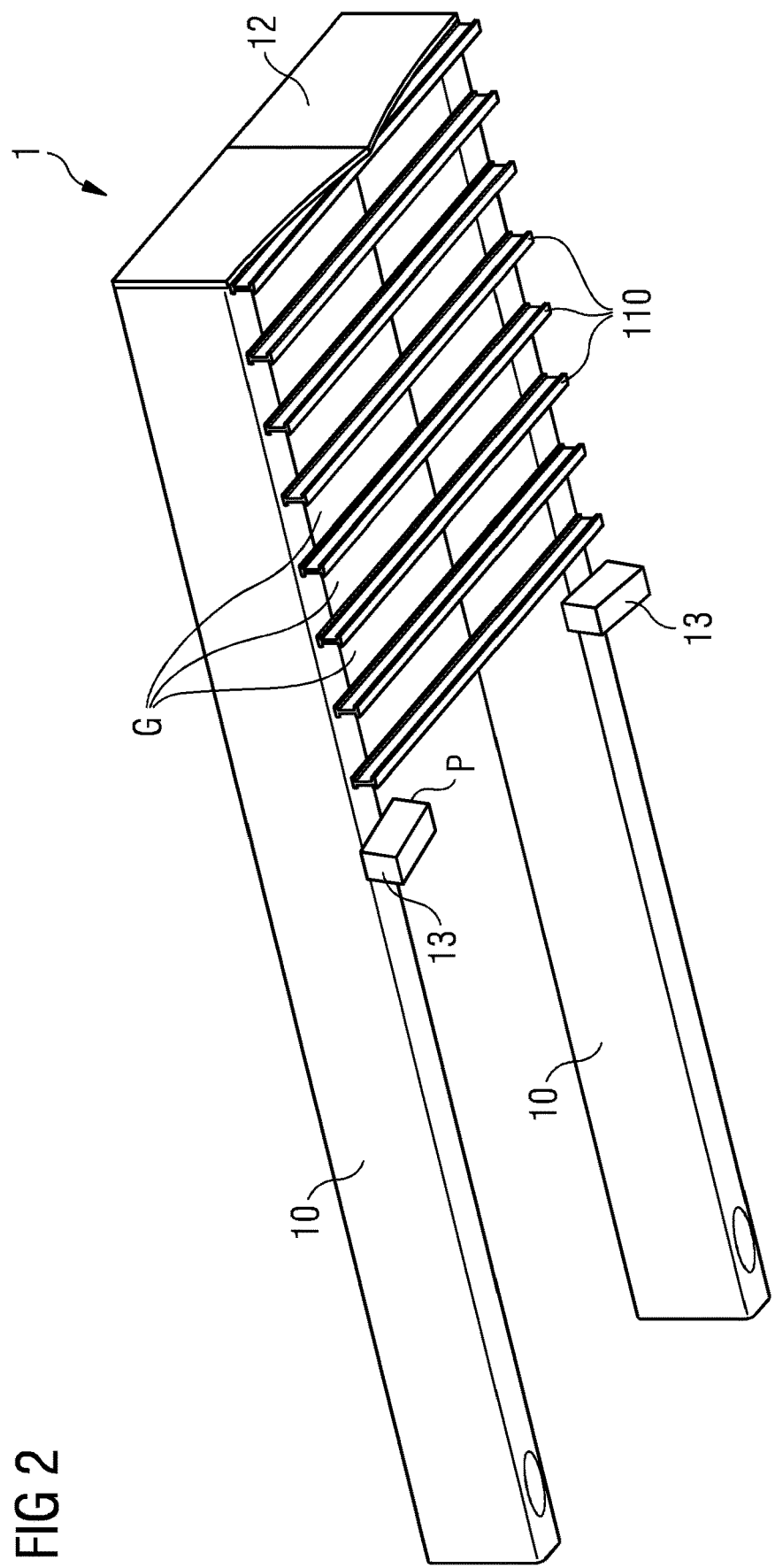
FIG. 2 shows a view from below onto an embodiment of the inventive nacelle platform structure.

FIG. 2 shows a view from below onto an embodiment of the (partially completed) inventive nacelle platform structure 1. The diagram shows an arrangement of supports 110, in this case steel I-beams, secured to the outward-extending portions of the beams 10. The diagram indicates the gaps G between these supports 110 which will later be covered by cladding. The diagram also indicates two adapter elements 13 that are shaped to match the shape of the back end of the nacelle 20. These elements present protrusions P that will also be covered by cladding in order to avoid snagging or "fouling" a heli-hoist hook or cable.

Figure 3:
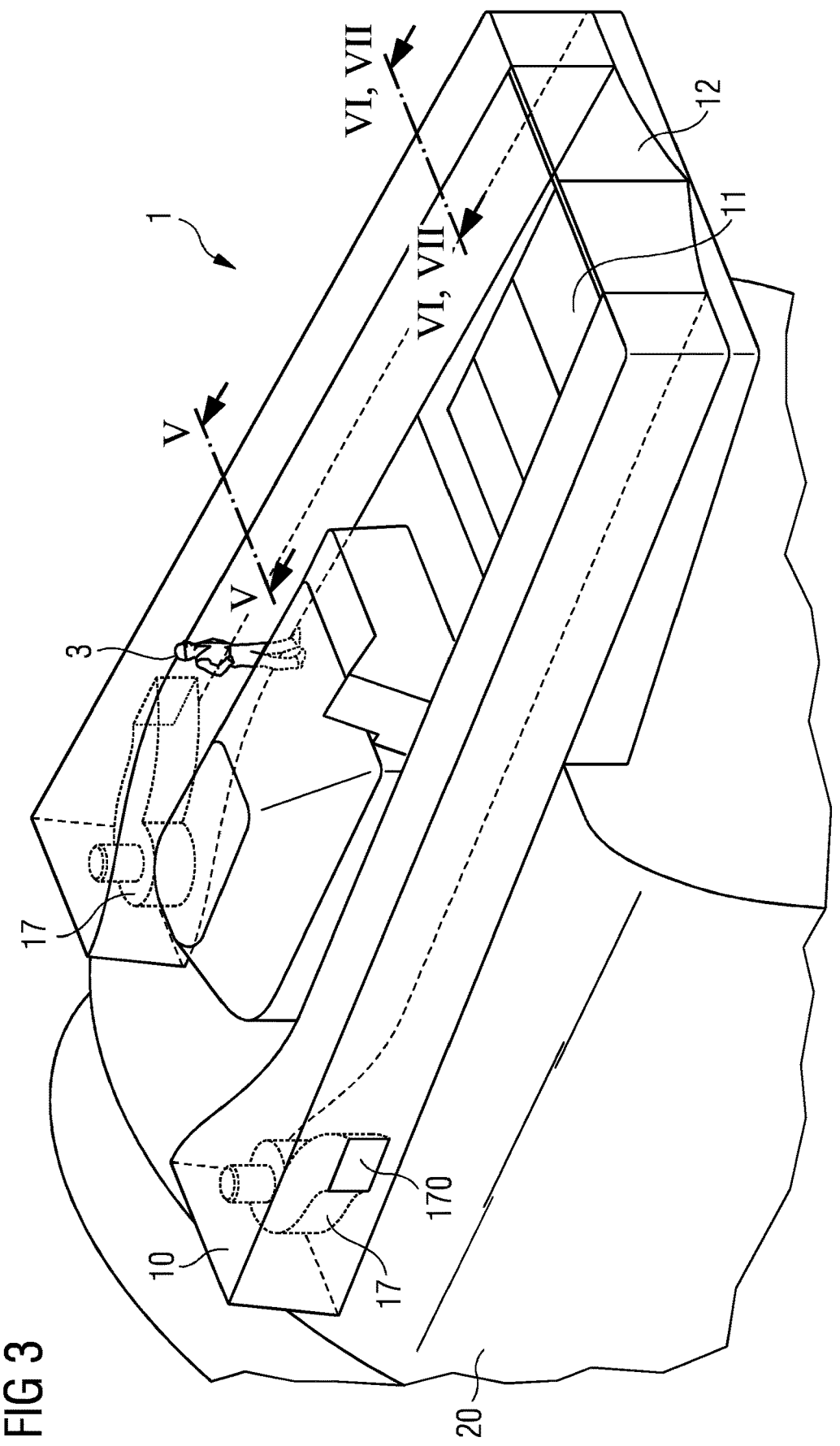
FIG. 3 shows a view from above onto an embodiment of the inventive nacelle platform structure.

FIG. 3 shows a view from above onto a wind turbine with an embodiment of the inventive nacelle platform structure 1. Here, the beams 10 are shaped to be wider towards the front end FE of the nacelle 20. The beams 10 are hollow, and can be made of a composite material that provides structural strength while being relatively light. Each beam 10 is shown to have an air intake opening 170 in a side face, and each beam 10 accommodates an air intake fan 17. By means of a suitable connecting passage to the nacelle interior, each air intake fan 17 can blow a cooling airflow into the interior of the nacelle. The fan intake is directly connected to the air intake opening 170. The diagram also shows a technician or service personnel 3 standing on the roof of the nacelle 20.

Figure 4:
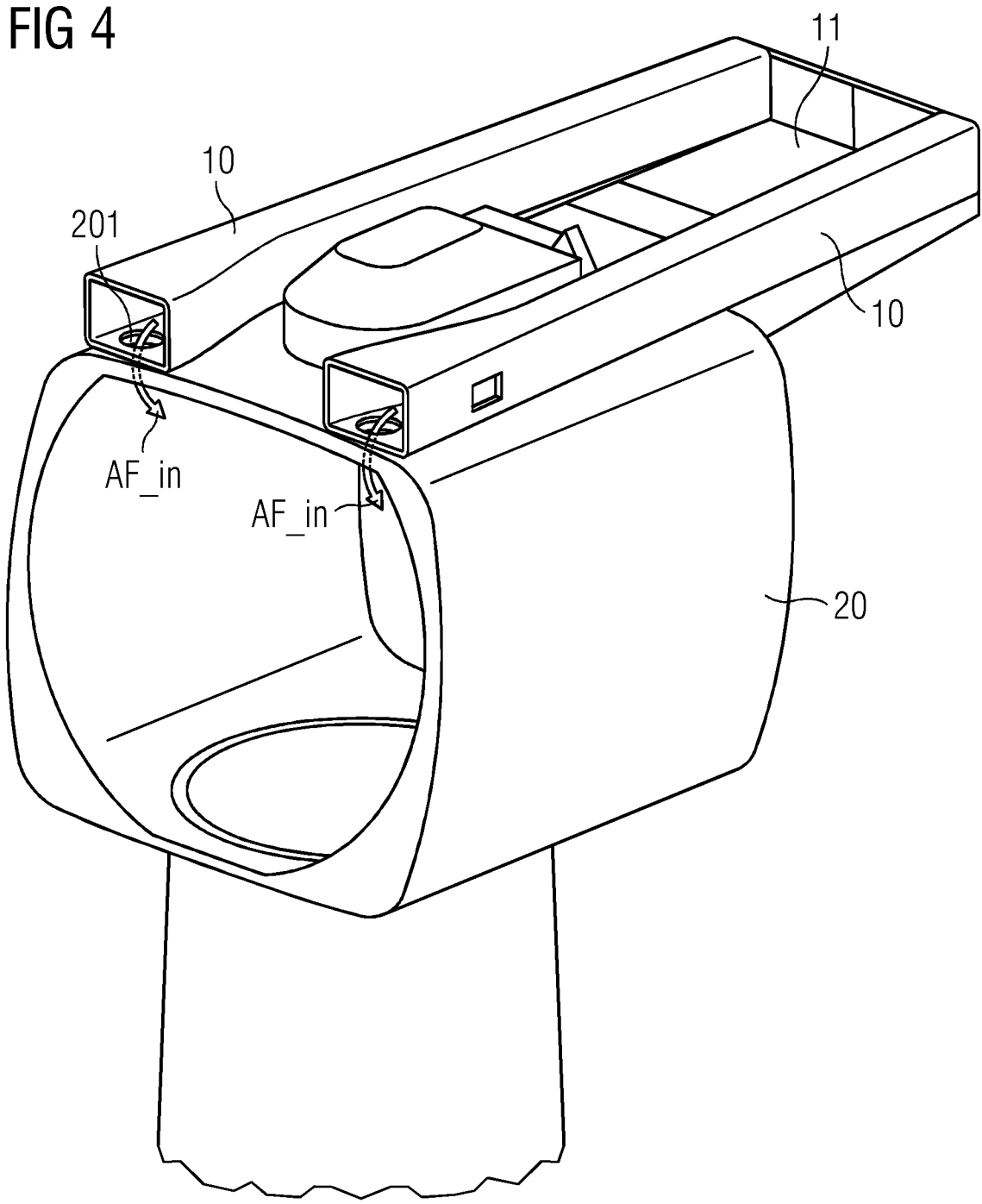
FIG. 4 shows part of an embodiment of the inventive wind turbine.

FIG. 4 shows another view of the embodiment of FIG. 3. Here, the diagram indicates air passages 201 formed towards the front end of the nacelle 20. An air intake fan 17 in each beam 10 can blow a cooling airflow AF_in through a passage 201 into the interior of the nacelle 20.

Figure 5:
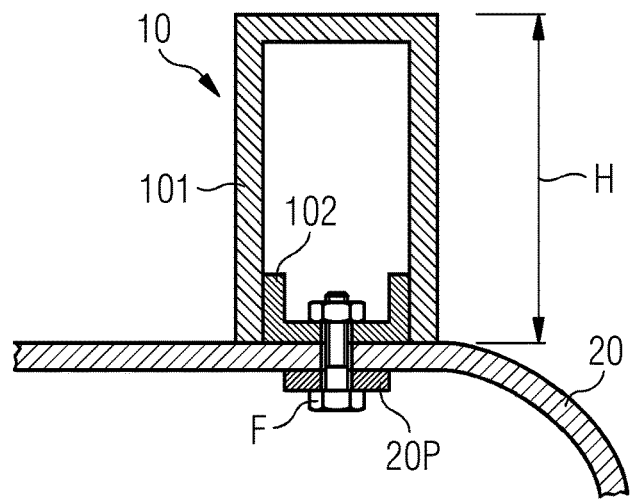
FIG. 5 shows a cross-section through V-V a beam in FIG. 3 of embodiments of the inventive nacelle platform structure.
Figure 6:
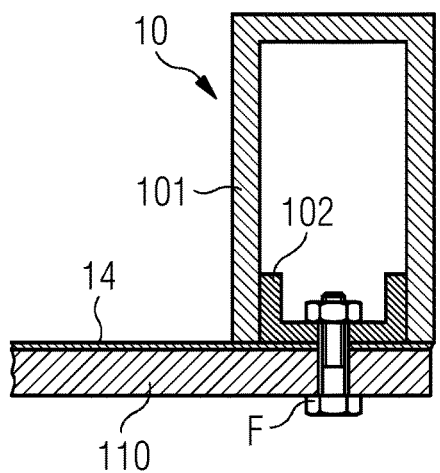
FIG. 6 shows additional cross-sections through VI-VI in a beam in FIG. 3 of embodiments of the inventive nacelle platform structure.
Figure 7:
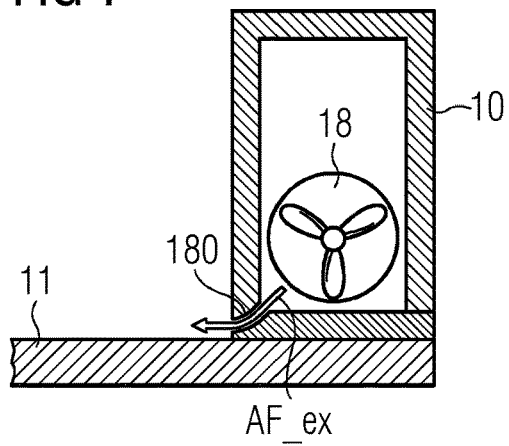
FIG. 7 shows additional cross-sections through VII-VII in a beam in FIG. 3 of the inventive nacelle platform structure.

FIGS. 5-7 show cross-sections through a beam in embodiments of the inventive nacelle platform structure. In FIG. 5, the cross-section V-V' is taken at a point over the nacelle 20, and shows how a beam 10 may be constructed and mounted to the nacelle 20. In this embodiment, the beam 10 comprises a bottom plate 102 which can be made of structural steel, for example. The other three sides of the beam 10 can be made of a composite material so that the beam 10 has a relatively low weight. Here, the beam 10 has a rectangular cross-section with a height H in the region of 1.5 m or more, and the beam 10 is essentially hollow. The bottom plate 102 is mounted to the nacelle 20 using any suitable fastening means F or by welding. A suitable structural element 20P of the nacelle 20, for example part of a framework, may be used to secure the beam 10. This step can be performed from within the interior of the nacelle, so that any connectors or fasteners are in the interior.

In FIG. 6, the cross-section VI-VI' is taken at a point in the platform region, and shows how a support 110 may be mounted to a beam 10. The bottom plate 102 of the beam 10 can be secured to the support using any suitable fastening means F or by welding. A layer of cladding 14 can be secured in place to cover any gaps between the supports 110 and, in this exemplary embodiment, to provide a walking surface of the platform 11. Here, the cladding 14 can comprise a rubber mat, a sheet metal plate, a sheet of composite material, etc. The winching area may be partially or completely covered by a cladding 14 made of an electrically conducting material that is grounded (earthed), e.g. by electrically connecting it to the nacelle bedframe or any other part that is in an electrical path to ground, so as to avoid any equipotential difference between the wind turbine and personnel being lowered from a helicopter to the winching area. The step of securing the supports 110 to the beams 10 can be performed prior to a step of installing the nacelle platform structure 1 to the wind turbine.

The cross-section VII-VII' shown in FIG. 7 indicates how a warming airflow AF ex may be used to de-ice the platform 11. The diagram indicates a fan 18 that is connected to an exhaust airflow of the wind turbine's cooling arrangement. At least some of the hot air AF_ex (heated by the generator during operation) that is to be expelled from the nacelle can be directed through suitable exit openings 180 along the lower edges of the beams 10 so that the hot air AF_ex passes over the platform 11. Any snow or ice on the platform 11 will melt so that the safety of personnel can be improved. As explained above, suitable run-off channels can be provided to allow melt-water or rain to run off the platform.

Although the present invention has been disclosed in the form of preferred embodiments and variations thereon, it will be understood that numerous additional modifications and variations could be made thereto without departing from the scope of the invention. The inventive nacelle platform structure may also be provided with warning equipment, e.g. lights or acoustic warning systems. The inventive nacelle platform structure may also accommodate further equipment usually found on a wind turbine such as lightning receptors and weather stations.

For the sake of clarity, it is to be understood that the use of "a" or "an" throughout this application does not exclude a plurality, and "comprising" does not exclude other steps or elements.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:
1. A wind turbine nacelle platform structure for a wind turbine, comprising:
a beam assembly comprising at least two beams arranged to extend from a front region of a wind turbine nacelle outward beyond a back end of the nacelle; and
a platform assembly mounted to an underside of an outward extending portion of the beam assembly;
wherein the wind turbine nacelle platform structure is mounted on top of a tower of the wind turbine, and secured to the wind turbine nacelle, and
wherein at least one beam of the beam assembly comprising the at least two beams is a substantially hollow beam, and wherein an interior of the substantially hollow beam is connected by a connecting passage with an interior of the nacelle.

2. The wind turbine nacelle platform structure according to claim 1, wherein the platform assembly comprises an arrangement of supports mounted to the underside of the outward extending portion of the beam assembly.

3. The wind turbine nacelle platform structure according to claim 1, comprising cladding arranged to cover at least one of gaps and protrusions of the nacelle platform structure.

4. The wind turbine nacelle platform structure according to claim 1, comprising an end-plate extending between outer ends of the beams of the beam assembly.

5. The wind turbine nacelle platform structure according to claim 1, wherein at least one beam of the beam assembly comprising at least two beams is secured to the nacelle from within the interior of the nacelle.

6. The wind turbine nacelle platform structure according to claim 1, wherein each beam of the beam assembly is arranged along an outer edge of the nacelle.

7. The wind turbine nacelle platform structure according to claim 1, wherein at least one beam of the beam assembly comprising the at least two beams comprises structural elements made of a composite material.

8. The wind turbine nacelle platform structure according to claim 1, wherein the platform assembly is grounded.

9. The wind turbine nacelle platform structure according to claim 1, comprising a winching area with a minimum dimension of 4 metres.

10. The wind turbine nacelle platform structure according to claim 1, wherein the substantially hollow beam comprises an air intake opening, and an intake fan arranged in the interior of substantially hollow beam to draw a cooling airflow into the interior of the nacelle.

11. The wind turbine nacelle platform structure according to claim 1, wherein the substantially hollow beam comprises an air outlet opening, and an outlet fan arranged in the interior of the substantially hollow beam to expel a heated airflow to an exterior of the nacelle.

12. The wind turbine nacelle platform structure according to claim 11, wherein the air outlet opening is directed at the platform assembly.

13. The wind turbine nacelle platform structure according to claim 1, wherein the wind turbine is a direct-drive wind turbine.

14. A wind turbine nacelle platform structure comprising:
two beams arranged to extend from a front region of a wind turbine nacelle outward beyond a back end of the wind turbine nacelle; and
a platform assembly mounted to an underside of a portion of the two beams;
wherein at least one beam of the two beams is substantially hollow and includes an interior cavity that is connected by a connecting passage with an interior of the wind turbine nacelle.

15. The wind turbine nacelle platform structure according to claim 14, further comprising:
at least one of an air intake opening and an air outlet opening.

16. A wind turbine, comprising:
a tower;
a nacelle;

a beam assembly; and a platform assembly;

wherein the beam assembly comprises a first beam and a second beam extending from a front region of the nacelle outward beyond a back end of the nacelle, and wherein the platform assembly is mounted to an underside of a portion of the first beam and the second beam extending outward beyond the back end of the nacelle;

wherein at least one of the first beam and second beam comprises an interior cavity connected with an interior cavity of the nacelle.

17. The wind turbine according to claim 16, wherein the at least one of the first beam and second beam comprises an air intake opening.

18. The wind turbine according to claim 16, wherein the at least one of the first beam and second beam comprises an air outlet opening.

\* \* \* \* \*